United States Patent
Roll et al.

(10) Patent No.: US 7,357,432 B2
(45) Date of Patent: Apr. 15, 2008

(54) BUMPER FOR A MOTOR VEHICLE

(75) Inventors: Michael Roll, Bielefeld (DE); Ulrich Lütke-Bexten, Paderborn (DE); Wilhelm Arns, Paderborn (DE); Elmar Mollemeier, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 95 days.

(21) Appl. No.: 11/425,857

(22) Filed: Jun. 22, 2006

(65) Prior Publication Data

US 2006/0290150 A1 Dec. 28, 2006

(30) Foreign Application Priority Data

Jun. 24, 2005 (DE) .................. 10 2005 029 770

(51) Int. Cl.
*B60R 19/34* (2006.01)
(52) U.S. Cl. .............. 293/133; 293/120; 293/132; 296/187.03; 296/187.09; 296/187.11
(58) Field of Classification Search ............... 293/120, 293/132, 133, 155; 296/187.03, 187.09, 296/187.11
See application file for complete search history.

(56) References Cited

U.S. PATENT DOCUMENTS

| | | | | |
|---|---|---|---|---|
| 4,225,167 | A | * | 9/1980 | Buettner et al. ............ 293/120 |
| 4,913,268 | A | * | 4/1990 | Parker et al. ........... 188/322.19 |
| 5,785,367 | A | | 7/1998 | Baumann et al. |
| 6,474,708 | B1 | * | 11/2002 | Gehringhoff et al. ........ 293/120 |
| 6,520,552 | B2 | * | 2/2003 | Schroter et al. ............ 293/132 |
| 6,779,821 | B2 | * | 8/2004 | Hallergren ................... 293/133 |
| 6,808,215 | B2 | * | 10/2004 | Sakuma et al. .............. 293/102 |
| 6,854,574 | B2 | * | 2/2005 | Yoshida et al. .............. 188/371 |
| 6,893,063 | B2 | * | 5/2005 | Harrison et al. ............ 293/117 |
| 6,926,325 | B2 | * | 8/2005 | Frank .......................... 293/133 |
| 6,929,297 | B2 | * | 8/2005 | Muller et al. ................ 293/133 |
| 7,066,509 | B2 | * | 6/2006 | Kollaritsch et al. ......... 293/133 |
| 7,070,217 | B2 | * | 7/2006 | Longo ......................... 293/132 |
| 7,077,442 | B2 | * | 7/2006 | Arns .......................... 293/155 |

FOREIGN PATENT DOCUMENTS

| | | |
|---|---|---|
| DE | 42 38 631 A1 | 5/1994 |
| DE | 101 35 903 A1 | 2/2003 |
| DE | 102 06 011 A1 | 8/2003 |
| JP | 2001158312 A | 6/2001 |
| WO | WO 02/30714 A1 | 4/2002 |

\* cited by examiner

*Primary Examiner*—D. Glenn Dayoan
*Assistant Examiner*—Greg Blankenship
(74) *Attorney, Agent, or Firm*—Henry M. Feiereisen

(57) ABSTRACT

A bumper for a motor vehicle includes a cross member disposed transversely to side rails of a motor vehicle frame and having a U-shaped cross section with a wall and two legs extending from opposite ends of the wall. The cross member is supported via integral crash boxes against the side rails. Each crash box has a cross member proximal end which abuts against the wall of the cross member, and includes vertical legs and horizontal legs to define a casing-like configuration. The wall of the cross member is formed in an area of the cross member proximal end of the crash box with a depression which extends in a direction of the crash box, with the vertical legs of the crash box joined at the cross member proximal end to the wall of the cross member, and with the horizontal legs of the crash box spaced from the wall of the cross member by a distance.

9 Claims, 4 Drawing Sheets

BUMPER FOR A MOTOR VEHICLE

CROSS-REFERENCES TO RELATED APPLICATIONS

This application claims the priority of German Patent Application, Serial No. 10 2005 029 770.6, filed Jun. 24, 2005, pursuant to 35 U.S.C. 119(a)-(d), the content of which is incorporated herein by reference.

BACKGROUND OF THE INVENTION

The present invention relates, in general, to a bumper for a motor vehicle.

Nothing in the following discussion of the state of the art is to be construed as an admission of prior art.

Bumpers are typically arranged across the front and rear of a motor vehicle between the plastic shell of the vehicle body and the frame of the motor vehicle. To prevent damage to the vehicle body structure in the event of a crash or impact at low speed, crash boxes are integrated to absorb energy caused by the impact and to convert the energy in deformation work.

German Offenlegungsschrift DE 42 38 631 A1 discloses a shock absorption device for absorbing the impact energy between a bumper and a vehicle body frame, having an inner tube and an outer tube which move within one another in the event of a collision. The inner tube is mounted to the legs of the cross member. This construction is heavy and complicated.

U.S. Pat. No. 6,520,552 describes a bumper for a motor vehicle, including a cross member having a U-shaped cross section and attached to side rails of a vehicle chassis. The cross member includes a web and two legs connected to the web. Received in the cross member is a crash box which has a cross member proximal end joined to the web and to confronting ends of the legs.

U.S. Pat. No. 5,785,367 discloses a bumper having a cross member extending transversely to side rails of a vehicle body, and crash boxes integral with the cross member. Cross member and crash boxes are joined through welding for example.

Welding the end of a crash box to the cross member about the entire circumference of the crash box is difficult to implement in view of the limited accessibility to the crash box end. Therefore, it has been proposed to omit a welding of the upper and lower horizontal legs of the crash box to the cross member. This, however, adversely affects deformation of the crash box. Practice has shown that the behavior of the crash box in the contact area of the non-welded upper and lower horizontal legs of the crash box is unpredictable so that a reliable assessment of the crumpling behavior of the bumper has been impossible to foresee in the event of an impact.

German Offenlegungsschrift DE 102 06 011 as well as DE 101 35 903 A1 disclose bumpers having a cross member having areas which are bulged inwardly in an attachment area with the crash boxes.

It would be desirable and advantageous to provide an improved bumper to obviate prior art shortcomings and to exhibit improved yielding capability.

SUMMARY OF THE INVENTION

According to one aspect of the present invention, a bumper for a motor vehicle includes a cross member disposed transversely to a side rail of a motor vehicle frame and having a U-shaped cross section formed by a wall and two legs extending from opposite ends of the wall, and a crash box connected to the cross member and having a cross member proximal end abutting against the wall of the cross member, said crash box having vertical legs and horizontal legs to define a casing-like configuration, wherein the wall of the cross member is formed in an area of the cross member proximal end of the crash box with a depression which extends in a direction of the crash box, wherein the vertical legs of the crash box are joined at the cross member proximal end to the wall of the cross member, and wherein the horizontal legs of the crash box are spaced from the wall of the cross member by a distance.

The present invention resolves prior art problems by providing a bumper in which the wall of the cross member is formed with at least one depression to project into the open end of the crash box, whereby the vertical legs of the crash box are joined to the wall of the cross member while the horizontal legs of the crash box are distanced from the wall. As a result, the vertical legs are secured to the cross member in a stable manner, and the movement behavior of the horizontal legs becomes predictable in longitudinal direction of the crash box by virtue of its disposition in the depression. Thus, deformation of the crash box is controlled and thus foreseeable, as the vertical legs of the crash box to the left and right of the depression are joined to the wall of the cross member, although the horizontal legs remain shy of the wall. The depression is located within the crash box and distanced from the horizontal legs. In the event of an impact, the depression in the wall of the cross member deforms to rest against the crash box. The free space to the horizontal legs assists hereby the controlled deformation, in particular as the crash box crumples. The distance between the horizontal legs of the crash box to the wall of the cross member ensures a desired initial folding, thereby positively affecting the yielding behavior of the bumper in the event of a crash and providing superior protection of the vehicle body overall. In view of the improved predictability of the deformation behavior of the bumper during simulation, a manufacturer is able to develop bumper systems that are superior in quality and reliable in operation and can be best suited to the overall vehicle system. In particular, undefined deformation behavior of the cross member proximal end of the crash box during initial moment of an impact as a result of indefinable conditions, such as direction of impact and speed or friction conditions, can be significantly reduced.

According to another feature of the present invention, the distance between the horizontal legs of the crash box from the wall of the cross member may range between 1 mm to 8 mm, in particular between 4 mm to 6 mm. This distance enables orientation of the deformation path as a result of the interaction between cross member and crash box, on one hand, and confers defined conditions for the crumpling process. This is true in particular for the initial deformation, when crumpling begins.

The depression in the cross member, projecting out toward the crash boxes into the cross member proximal ends may be constructed in many ways. While the depression may have a trough-shaped or bulbed configuration, implemented through stamping, or may have a channel configuration in the form of an embossment, other configurations are, of course, possible so long as a targeted orientation of the degrees of freedom of the crash box in the event of an impact and thus an undefined escape of the horizontal legs is prevented.

According to another feature of the present invention, the wall of the cross member may have two depressions which are disposed above one another in vertical spaced-apart relationship and extend in parallel relationship to the legs of the cross member. As a consequence, the horizontal legs of the crash box are restricted in their movement in the area of the cross member proximal end of the crash box.

According to another feature of the present invention, the wall of the cross member may be formed in addition to the presence of a depression or depressions, with an opening in the area of the end surface of the crash box. In this way, it is possible to bring in a tow lug for a lug attachment inside the crash box.

According to another feature of the present invention, the crash box is defined by a length axis and may be formed with embossments and stamped zones extending transversely to the length axis. The provision of embossments or stamped zones assists a targeted deformation of the crash box. In addition, the stiffness property of a crash box can be positively affected by suitably selecting the type, configuration and disposition of the embossments or stamped zones.

The crash box has a casing-like configuration in the form of a thin-walled hollow body of sheet metal. Suitably, the crash box is made of two shells, namely an upper shell and a lower shell, which are joined to one another. Upper and lower shells are joined together along the longitudinal edges of their vertical legs. The crash box is hereby open toward the cross member. In proximity of the side rails, the crash box is typically provided with an attachment flange for connection to the side rails.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
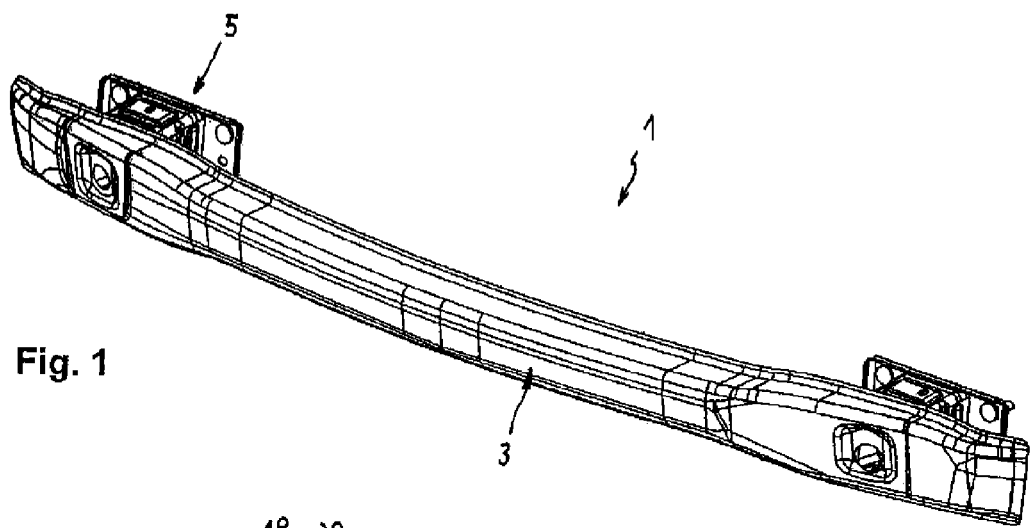
FIG. 1 is a perspective illustration of a first embodiment of a bumper according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of a first embodiment of a bumper according to the present invention, generally designated by reference numeral 1, for a motor vehicle. The bumper 1 includes a cross member 3 which extends transversely to unillustrated side rails of the vehicle frame (not shown). Disposed integrally between the side rails and the cross member 3 are casing-like crash boxes 5 to form deformation elements for absorbing energy in the event of a crash.

Figure 2:
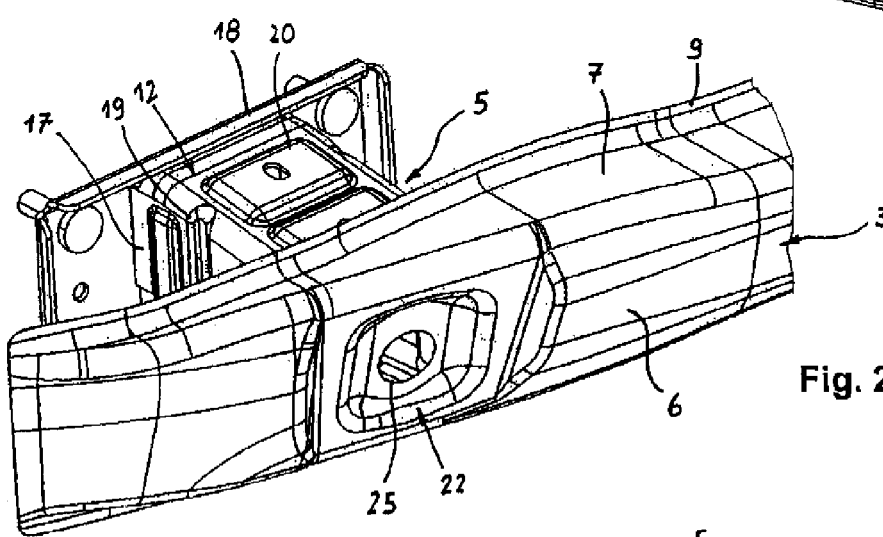
FIG. 2 is a perspective illustration of an end portion of a cross member of the bumper of FIG. 1 together with a crash box.
Figure 3:
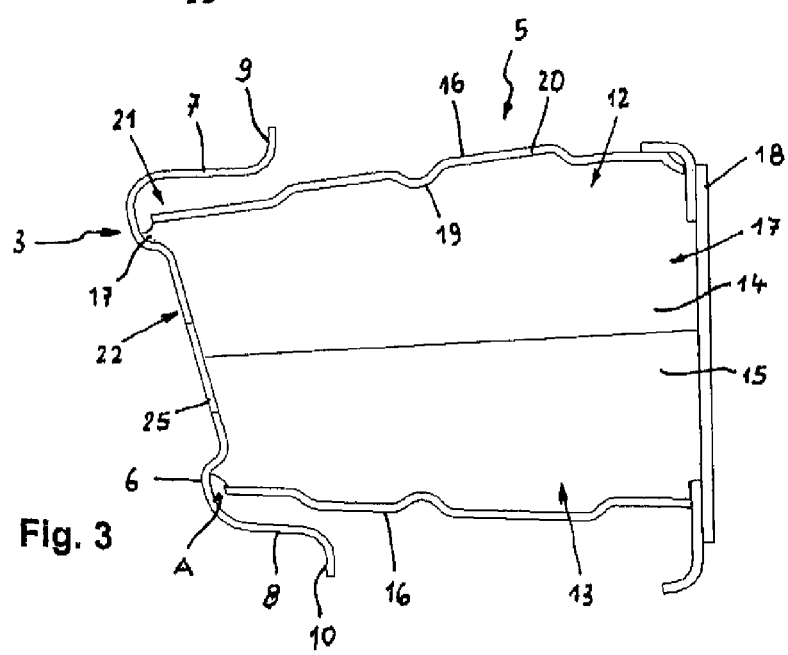
FIG. 3 is a schematic vertical section of crash box and cross member of the bumper of FIG. 1.

As shown in particular in FIGS. 2 and 3, the cross member 3 has, at least over a major part of its length dimension, an open profile of U-shaped cross section toward the crash boxes 5. The cross member 3 has a front wall 6, an upper leg 7 and a lower leg 8, whereby the upper and lower legs 7, 8 extend from the wall 6, as shown in particular in FIG. 3, and terminate in outwardly directed flanges 9, 19, respectively.

Each crash box 5 is constructed as a deformation member in the form of an elongate hollow body of thin-walled metal structure which is implemented by joining together two shells 12, 13 of U-shaped configuration. The shells 12, 13 have side legs 14, 15 with their confronting ends overlapping one another and joined together. The crash box 5 has an upper and lower horizontal wall 16 and two lateral vertical walls 17 and is completed by flanges 18 which face the side rails. The horizontal walls 16 and the vertical walls 17 are provided with a number of embossments 19 and stamped zones 20, extending transversely to the length axis of the crash box 5.

Figure 7:
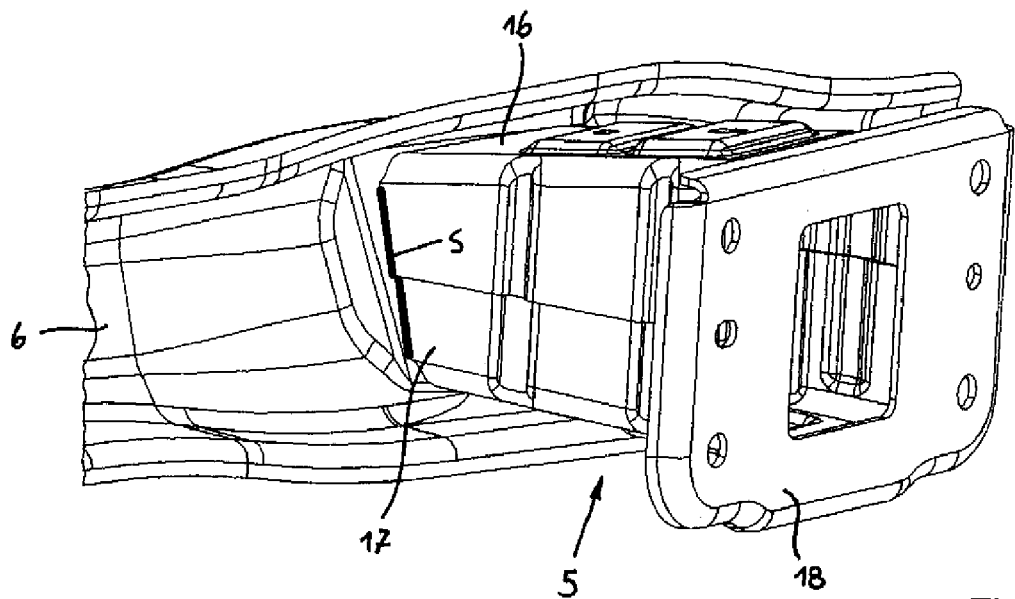
FIG. 7 is a top, left side and back perspective view of a crash box of a bumper according to the present invention.
Figure 8:
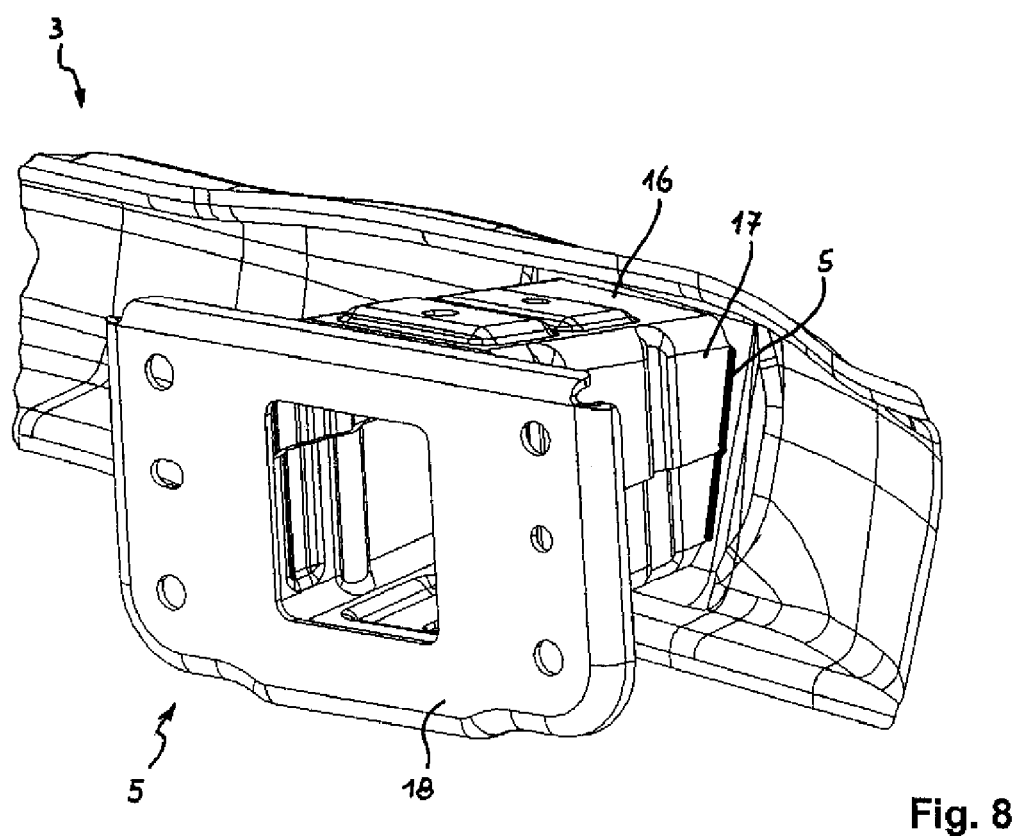
FIG. 8 is a top, right side and back perspective view of the crash box of FIG. 7.
Figure 9:
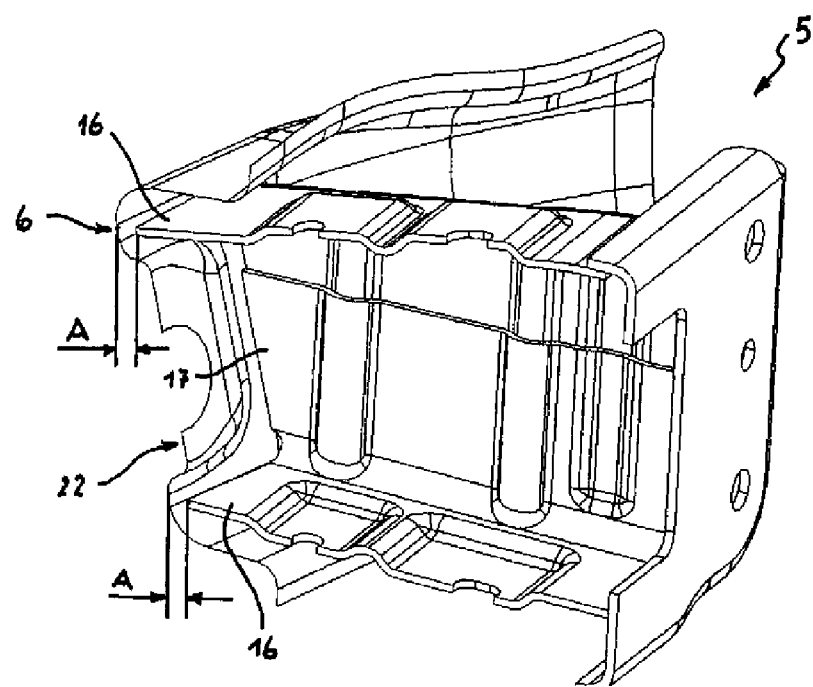
FIG. 9 is a perspective view of the crash box of FIG. 7, which has been broken open to show its interior.
Figure 10:
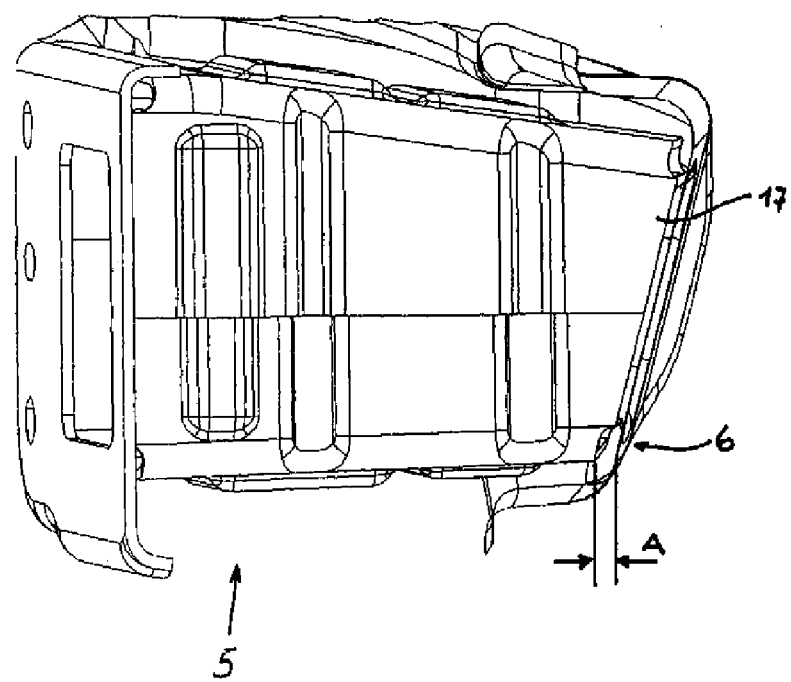
FIG. 10 is a further section of the crash box of FIG. 7.

The crash box 5 has a cross member proximal end 21 (FIG. 3) which dips into the U-shaped cross member 3 and is connected with its vertical legs 17 inside the cross member 3 to the wall 6 thereof by means of respective weld seams S, as shown in particular in FIGS. 7 and 8. The horizontal legs 16 of the crash box 5 on the other hand is not connected to the cross member 3 but extends at a distance A to the wall 6, as indicated in FIGS. 3, 9 and 10. The distance A may range between 1 mm and 8 mm. Currently preferred is a distance A ranging from 4 mm to 6 mm.

As further shown in FIG. 3, the wall 6 of the cross member 3 is recessed in the area of the cross member proximal end 21 of the crash box 5 to form a depression 22 which extends toward the crash box 5 to thereby project into the open end 21 of the crash box 5. The depression 22 is positioned and configured to influence and restrict a movement of the horizontal legs 16 of the crash box 5 in the event of a deformation so as to prevent an uncontrolled deflection or collapsing of the horizontal legs 16. This effect is assisted by the presence of distance A because initial crumpling is not adversely affected. As the deformation progresses, the depression 22 and thus the wall 6 ultimately bears fully against the crash box 5 and the initiated crumpling motion of the crash box 5 proceeds in a controlled manner. In this way, energy is absorbed in an optimum way as the crash box 5 deforms.

The depression 22 of the cross member 3 has a trough-shaped configuration, with the wall 6 being formed in the area of the depression 22 with an opening 25 through which a tow lug may be inserted for example.

Figure 4:
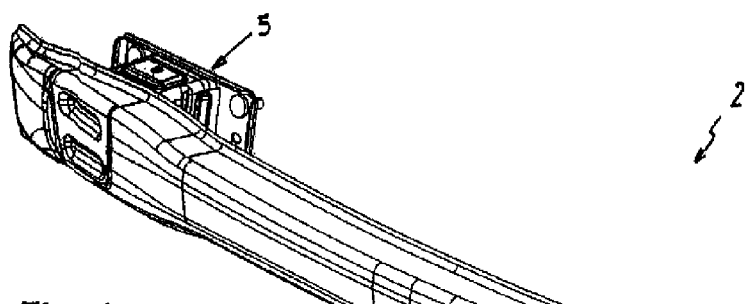
FIG. 4 is a perspective illustration of a second embodiment of a bumper according to the present invention.
Figure 5:
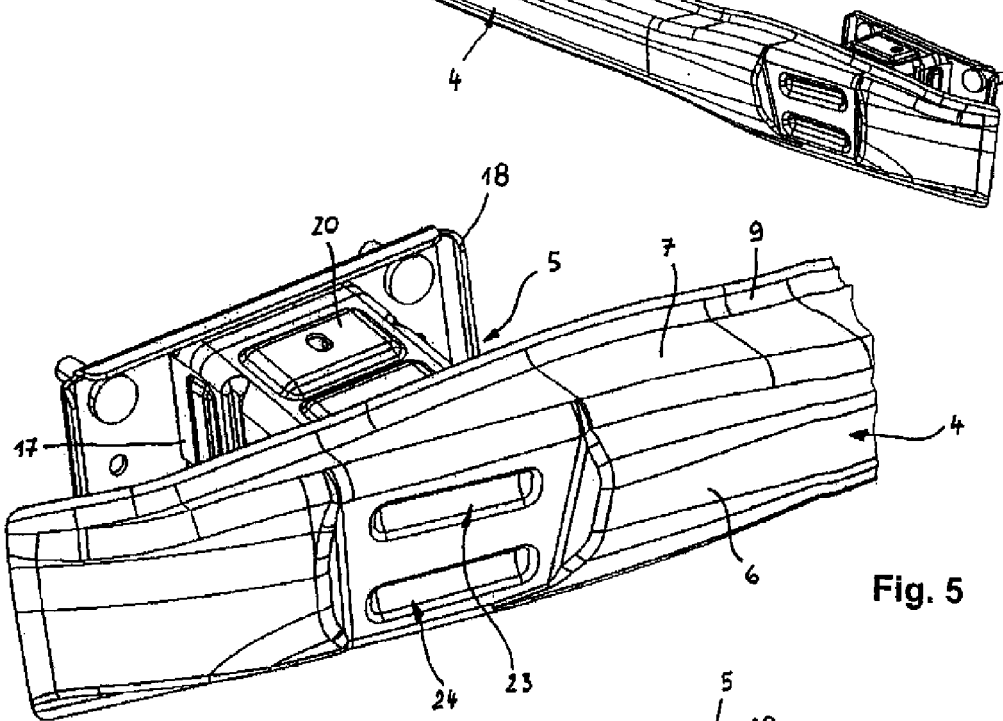
FIG. 5 is a perspective illustration of an end portion of a cross member of the bumper of FIG. 4 together with a crash box.
Figure 6:
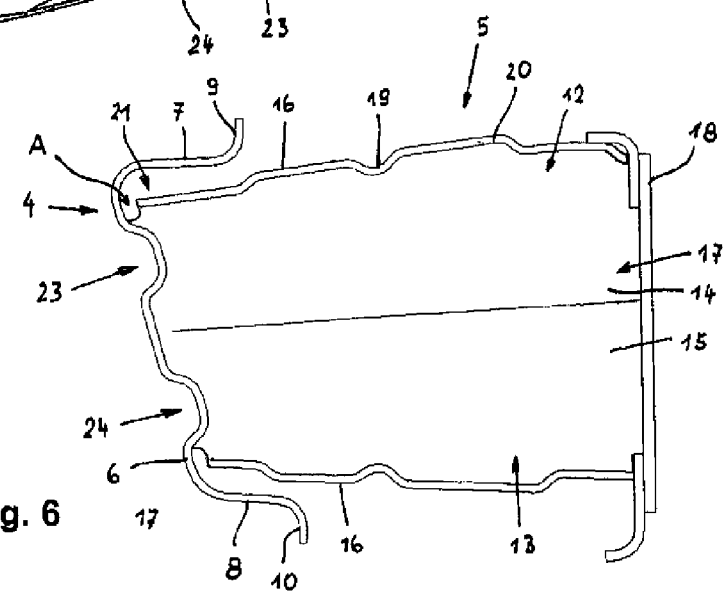
FIG. 6 is a schematic vertical section of crash box and cross member of the bumper of FIG. 4.

Referring now to FIG. 4, there is shown a perspective illustration of a second embodiment of a bumper according to the present invention, generally designated by reference numeral 2. Parts corresponding with those in FIG. 1 are denoted by identical reference numerals and not explained again. The description below will center on the differences between the embodiments. In this embodiment, the bumper 2 has a cross member 4 which differs from the cross member 3 of bumper 1 by providing the wall 6 of the cross member 4 with two depressions 23, 24 which have a channel-like configuration in the form of embossments, as shown in FIGS. 5 and 6. Both depressions 23, 24 are disposed above one another at a vertical distance and extend in parallel relationship to the upper and lower legs 7, 8 of the cross member 4. The depressions 23, 24 are hereby situated in proximity of the upper and lower horizontal legs 17, respectively, of the crash box 5.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper for a motor vehicle, comprising:
   a cross member disposed transversely to a side rail of a motor vehicle frame and having a U-shaped cross section formed by a wall and two legs extending from opposite ends of the wall; and
   a crash box connected to the cross member and having a cross member proximal end abutting against the wall of the cross member, said crash box having vertical legs and horizontal legs to define a casing-like configuration,
   wherein the wall of the cross member is formed in an area of the cross member proximal end of the crash box with a depression which extends in a direction of the crash box,
   wherein the vertical legs of the crash box are joined at the cross member proximal end to the wall of the cross member, and
   wherein the horizontal legs of the crash box are spaced from the cross member by a distance.

2. The bumper of claim 1, wherein the distance ranges between 1 mm to 8 mm.

3. The bumper of claim 1, wherein the distance ranges between 4 mm to 6 mm.

4. The bumper of claim 1, wherein the depression has a trough-shaped configuration.

5. The bumper of claim 1, wherein the depression has a configuration of a channel.

6. The bumper of claim 1, wherein the wall of the cross member has an opening in an area of the cross member proximal end of the crash box.

7. The bumper of claim 1, wherein the wall of the cross member has two depressions disposed above one another in vertical spaced-apart relationship and extending in parallel relationship to the legs of the cross member.

8. The bumper of claim 1, wherein the crash box is defined by a length axis and formed with embossments and stamped zones extending transversely to the length axis.

9. The bumper of claim 1, wherein the crash box is made of two shells joined to one another.

\* \* \* \* \*